(12) United States Patent
van der Schaar et al.

(10) Patent No.: US 7,042,944 B2
(45) Date of Patent: May 9, 2006

(54) SINGLE-LOOP MOTION-COMPENSATION FINE GRANULAR SCALABILITY

(75) Inventors: Mihaela van der Schaar, Martinez, CA (US); Hayder Radha, East Lansing, MI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1023 days.

(21) Appl. No.: 09/887,756

(22) Filed: Jun. 21, 2001

(65) Prior Publication Data

US 2002/0037048 A1 Mar. 28, 2002

Related U.S. Application Data

(60) Provisional application No. 60/239,661, filed on Oct. 21, 2000, and provisional application No. 60/234,499, filed on Sep. 22, 2000.

(51) Int. Cl.
*H04N 7/00* (2006.01)

(52) U.S. Cl. .................................................. 375/240.1

(58) Field of Classification Search ............. 375/240.1, 375/240.12; 382/240
See application file for complete search history.

(56) References Cited

U.S. PATENT DOCUMENTS

| 4,723,161 | A | | 2/1988 | Koga .................... 358/136 |
| 5,886,736 | A | * | 3/1999 | Chen ..................... 348/43 |
| 6,614,936 | B1 | * | 9/2003 | Wu et al. ............... 382/238 |
| 6,700,933 | B1 | * | 3/2004 | Wu et al. ............. 375/240.16 |

FOREIGN PATENT DOCUMENTS

EP 0595403 A1 10/1993

* cited by examiner

*Primary Examiner*—Chris Kelley
*Assistant Examiner*—Matthew Haney

(57) ABSTRACT

A video coding technique having motion compensation for bi-directional predicted frames (B-frames) and predicted frames (P-frames). The video coding technique involves a single-loop prediction-based base layer which includes base layer B- and/or P-frames that are generated from "extended" or "enhanced" base layer reference frames during base layer coding.

35 Claims, 8 Drawing Sheets

SINGLE-LOOP MOTION-COMPENSATION FINE GRANULAR SCALABILITY

This application claims benefit of U.S. provisional application 60/239,661 filed Oct. 12, 2000 which claims benefit of U.S. provisional application 60/234,499 filed Sep. 22, 2000.

RELATED APPLICATIONS

Commonly-assigned, copending U.S. patent application, No. 09/887,743, entitled "Double-Loop Motion-Compensation Fine Granular Scalability", filed Jun. 21, 2001.

Commonly-assigned, copending U.S. patent application, No. 09/930,672, entitled "Totally Embedded FGS Video Coding with Motion Compensation", filed Aug. 15, 2001.

FIELD OF THE INVENTION

The present invention relates to video coding, and more particularly to a scalable video coding scheme that employs a single-loop motion compensation process for bi-directional predicted frames (B-frames) and predicted frames and bi-directional predicted frames and (P- and B-frames), while using portions of the enhancement layer frames.

BACKGROUND OF THE INVENTION

Scalable enhancement layer video coding has been used for compressing video transmitted over computer networks having a varying bandwidth, such as the Internet. A current enhancement layer video coding scheme employing fine granular scalable coding techniques (adopted by the ISO MPEG-4 standard) is shown in FIG. 1. As can be seen, the video coding scheme 10 includes a prediction-based base layer 11 coded at a bit rate $R_{BL}$, and an FGS enhancement layer 12 coded at $R_{EL}$.

The prediction-based base layer 11 includes intraframe coded I frames, interframe coded P frames which are temporally predicted from previous I- or P-frames using motion estimation-compensation, and interframe coded bi-directional B-frames which are temporally predicted from both previous and succeeding frames adjacent the B-frame using motion estimation-compensation. The use of predictive and/or interpolative coding i.e., motion estimation and corresponding compensation, in the base layer 11 reduces temporal redundancy therein, but only to a limited extent, since only base layer frames are used for prediction.

The enhancement layer 12 includes FGS enhancement layer I-, P-, and B-frames derived by subtracting their respective reconstructed base layer frames from the respective original frames (this subtraction can also take place in the motion-compensated domain). Consequently, the FGS enhancement layer I-, P- and B-frames in the enhancement layer are not motion-compensated. (The FGS residual is taken from frames at the same time-instance.) The primary reason for this is to provide flexibility which allows truncation of each FGS enhancement layer frame individually depending on the available bandwidth at transmission time. More specifically, the fine granular scalable coding of the enhancement layer 12 permits an FGS video stream to be transmitted over any network session with an available bandwidth ranging from $R_{min}=R_{BL}$ to $R_{max}=R_{BL}+R_{EL}$. For example, if the available bandwidth between the transmitter and the receiver is B=R, then the transmitter sends the base layer frames at the rate $R_{BL}$ and only a portion of the enhancement layer frames at the rate $R_{EL}=R-R_{BL}$. As can be seen from FIG. 1, portions of the FGS enhancement layer frames in the enhancement layer can be selected in a fine granular scalable manner for transmission. Therefore, the total transmitted bit-rate is $R=R_{BL}+R_{EL}$. Because of its flexibility in supporting a wide range of transmission bandwidth with a single enhancement layer.

FIG. 2 shows a block-diagram of a conventional FGS encoder for coding the base layer 11 and enhancement layer 12 of the video coding scheme of FIG. 1. As can be seen, the enhancement layer residual of frame i (FGSR(i)) equals MCR(i)-MCRQ(i), where MCR(i) is the motion-compensated residual of frame i, and MCRQ(i) is the motion-compensated residual of frame i after the quantization and the dequantization processes.

Although the current FGS enhancement layer video coding scheme 10 of FIG. 1 is very flexible, it has the disadvantage that its performance in terms of video image quality is relatively low compared with that of a non-scalable coder functioning at the same transmission bit-rate. The decrease in image quality is not due to the fine granular scalable coding of the enhancement layer 12 but mainly due to the reduced exploitation of the temporal redundancy among the FGS residual frames within the enhancement layer 12. In particular, the FGS enhancement layer frames of the enhancement layer 12 are derived only from the motion-compensated residual of their respective base layer I-, P-, and B-frames, no FGS enhancement layer frames are used to predict other FGS enhancement layer frames in the enhancement layer 12 or other frames in the base layer 11.

Accordingly, a scalable video coding scheme is needed that employs portions of the enhancement layer frames for motion compensation to improve image quality while preserving most of the flexibility and attractive characteristics typical to the current FGS video coding scheme.

SUMMARY OF THE INVENTION

The present invention is directed to a video coding scheme that employs portions of enhancement layer frames, typically FGS enhancement layer frames, for predicting B- and P-frames. One aspect of the invention involves a method comprising the steps of: encoding an uncoded video to generate extended base layer reference frames, each of the extended base layer reference frames including a base layer reference frame and at least a portion of an associated enhancement layer reference frame; predicting base layer frames from the extended base layer reference frames; and generating frame residuals from the uncoded video and the base layer frames.

Another aspect of the invention involves a method comprising the steps of: decoding the base layer and enhancement layer streams to generate extended base layer reference frames, each of the extended base layer reference frames including a base layer reference frame and at least a portion of an associated enhancement layer reference frame; and predicting base layer frames from the extended base layer reference frames.

Still another aspect of the invention involves a memory medium for encoding video, comprising: code for encoding an uncoded video to generate extended base layer reference frames, each of the extended base layer reference frames including a base layer reference frame and at least a portion of an associated enhancement layer reference frame; code for predicting base layer frames from the extended base layer reference frames; and code for generating frame residuals from the uncoded video and the base layer frames.

A further aspect of the invention involves a memory medium for decoding a compressed video having a base layer stream and an enhancement layer stream, comprising: code for decoding extended base layer reference frames from the base layer and enhancement layer streams, each of the extended base layer reference frames including a base layer reference frame and at least a portion of an associated enhancement layer reference frame; and code for predicting base layer frames from the extended base layer reference frames.

Still a further aspect of the invention involves an apparatus for coding video, which comprises: means for encoding an uncoded video to generate extended base layer reference frames, each of the extended base layer reference frames including a base layer reference frame and at least a portion of an associated enhancement layer reference frame; means for predicting base layer frames from the extended base layer reference frames; and means for generating frame residuals from the uncoded video and the base layer frames.

Still another aspect of the invention involves an apparatus for decoding a compressed video having a base layer stream and an enhancement layer stream, which comprises: means for decoding extended base layer reference frames from the base layer and enhancement layer streams, each of the extended base layer reference frames including a base layer reference frame and at least a portion of an associated enhancement layer reference frame; and means for predicting base layer frames from the extended base layer reference frames.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION OF THE INVENTION

Figure 3A:
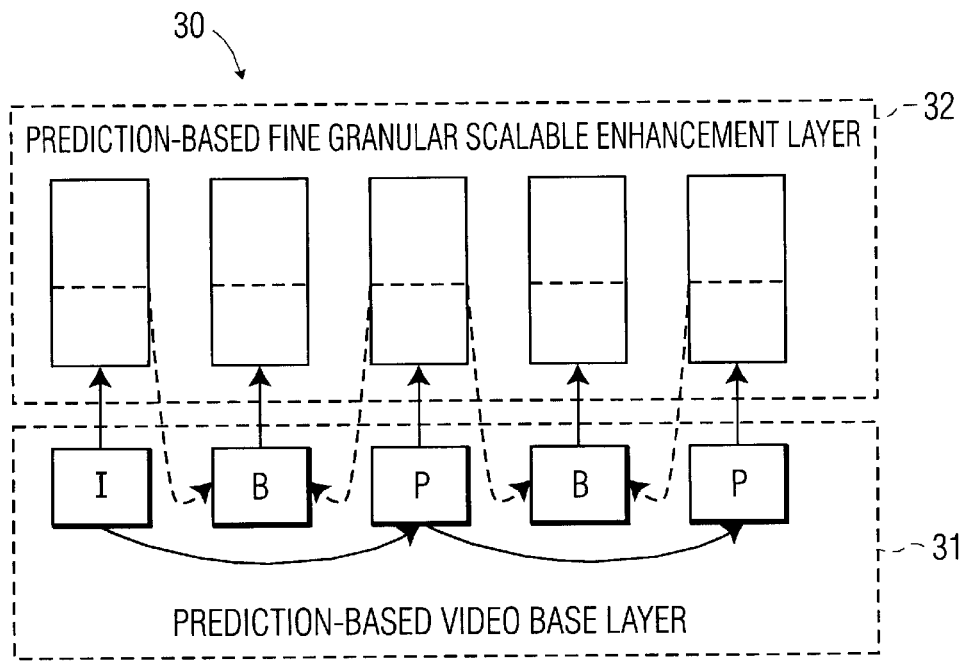
FIG. 3A shows an enhancement layer video coding scheme according to a first exemplary embodiment of the present invention.

FIG. 3A shows an enhancement layer video coding scheme 30 according to a first exemplary embodiment of the present invention. As can be seen, this enhancement layer video coding scheme 30 includes a prediction-based (single-loop motion compensation) base layer 31 and an enhancement layer 32.

The prediction-based base layer 31 includes intraframe coded I-frames and interframe coded P-frames, which are generated conventionally during base layer (non-scalable) coding from standard base layer I- and P- reference frames. In accordance with the principles of the present invention, the prediction-based base layer 31 also includes interframe coded bi-directional B-frames, which are generated from "extended" or "enhanced" base layer I- and P- or P- and P- reference frames (hereinafter extended base layer I- and P- reference frames) during base layer coding. Each extended base layer reference frame comprises a standard base layer reference frame, and at least a portion of an associated enhancement layer reference frame (one or more bitplanes or fractional bit-planes of the associated enhancement layer reference frame can be used).

The enhancement layer 32 includes I-, P-, and B-frames, which are generated conventionally by subtracting their respective reconstructed (decoded) base layer I-, P- and B-frame residuals from their respective original base layer I-, P- and B-frame residuals. The enhancement layer B-frames are conventionally coded, however, their respective residual frames include less information because their respective base layer frames are partially predicted from enhancement layer reference frames, while the P-frames (and of course the I-frames) are not. The enhancement layer I-, P-, B-frames may be coded with any suitable scalable codec, preferably a fine granular scalable (FGS) codec as shown in FIG. 3A.

As one of ordinary skill in the art will appreciate, the video coding scheme 30 of the present invention improves the image quality of the video. This is because the video coding scheme 30 uses enhancement layer frames to reduce temporal redundancy in the base layer B-frames.

Further, it is important to note that rate-control plays an important role for achieving good performance with the video coding scheme of the present invention. However, even a simplistic approach which allocates the total bit-budget Btot for a GOP according to Btot=bI*No._I_frames+bP*No._P_frames+bB*No._B_frames, where bI>bP>bB, already provides very good results. Further note that a different number of enhancement layer bits/bitplanes (does not have to be an integer number of bits/bitplanes) can be considered for each enhancement layer reference frame used in the motion compensation loop. Moreover, if desired, only certain parts or frequencies within the enhancement layer reference frame need be used as references for the base layer motion-compensation loop.

As should be apparent, the video coding scheme of FIG. 3A modifies the performance of the base layer. The concept of a base layer still exists even though the motion compensation prediction employs enhancement layer information in the motion compensation loop of the base layer, as the resulting B-frame frames are still partially coded with standard quantization and entropy encoding used for conventional base layer encoding. The advantage of coding a portion of the B-frames with standard quantization and entropy encoding is that the resulting video coding scheme remains base layer MPEG-4 compliant. The remaining portions of the B-frames (B-frame residuals) are coded with a scalable codec such as FGS.

The reason for not coding the entire motion-predicted portion of the enhancement layer I- and P-frames as an "extended" base layer is that the coding scheme employed for the base layer frames is not scalable and if the transmission bandwidth drops below the rate necessary for transmitting this "extended" base layer, the stream cannot be truncated and thus, the entire data until the next I-frame will be lost. With the video coding scheme of the present invention, even though prediction drift occurs if only a very limited part of the enhancement layer bits is received, a decodable stream can still be received at all bit-rates between $R_{BL}$ and $R_{MAX}$.

Figure 4:
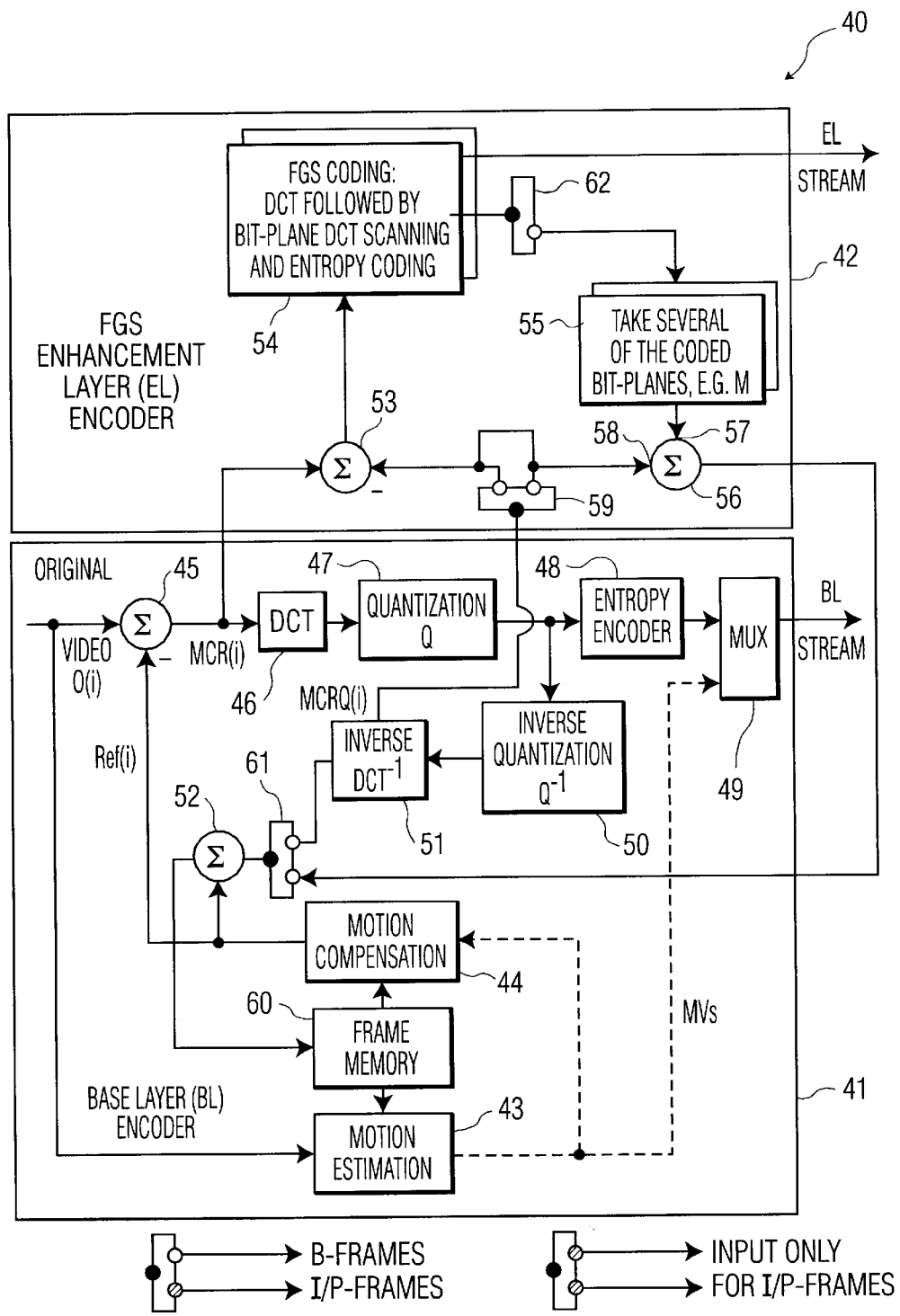
FIG. 4 shows a block-diagram of an encoder, according to an exemplary embodiment of the present invention, that may be used for generating the enhancement layer video coding scheme of FIG. 3A.

FIG. 4 shows a block-diagram of an encoder 40, according to an exemplary embodiment of the present invention, that may be used for generating the enhancement layer video coding scheme of FIG. 3A. As can be seen, the encoder 40 includes a base layer encoder 41 and an enhancement layer encoder 42. The base layer encoder 41 is conventional and includes a motion estimator 43 that generates motion information (motion vectors and prediction modes) from the original video sequence and frames stored in frame memory 60. This motion information is then applied to a motion compensator 44 that generates conventional motion-compensated base layer reference frames and motion-compensated versions of the extended base layer I- and P- reference frames of the present invention (all denoted Ref(i)) using the motion information and conventional reference frames and the extended base layer I- and P- reference frames stored in the frame memory 60. A first subtractor 45 subtracts the motion-compensated reference frames Ref(i) from the original video sequence to generate motion-compensated residuals of the base layer frames MCR(i). The motion-compensated residuals of the base layer frames MCR(i) are processed by a discrete cosine transform (DCT) encoder 46, a quantizer 47, and an entropy encoder 48 to generate the base layer I-, P-, and B-frames, which form a portion of a compressed base layer stream. The motion information generated by the motion estimator 43 is also applied to a multiplexer 49, which combines the motion information with the base layer I-, P-, and B-frames to complete the compressed base layer stream. The quantized motion-compensated residuals of the base layer frames MCR(i) generated at the output of the quantizer 47 are dequantized by an inverse quantizer 50, and then decoded by an inverse DCT decoder 51. This process generates quantized/dequantized versions of the motion-compensated residuals of the base layer frames MCRQ(i) at the output of the inverse DCT 51. A first frame flow control device 61 routes the quantized/dequantized motion-compensated residuals of the base layer I- and P- frames at the output of the inverse DCT 51 to a first adder 52, which sums them with their corresponding motion-compensated base layer reference frames Ref(i), hence generating the conventional base layer reference frames that are stored in the frame memory 60 as described above.

The enhancement layer encoder 41 applies the quantized/dequantized motion-compensated residuals of the base layer I-, P-, and B-frames to a second subtractor 53, via a second frame flow control device 59. The second subtractor 53 subtracts the quantized/dequantized motion-compensated residuals of the base layer frames from the corresponding motion-compensated residuals of the base layer frames to generate differential I-, P-, B-frame residuals FGSR(i). The output of the second subtractor 53 is enhancement layer coded by an FGS encoder 54 or like scalable encoder. The FGS encoder 54 uses conventional DCT encoding followed by conventional bit-plane DCT scanning and conventional entropy encoding to generate a compressed enhancement layer stream. A masking device 55 takes one or more of the coded bit planes of the enhancement layer encoded I- and P-frames selectively routed through a third frame flow control device 62, and applies this data to a first input 57 of a second adder 56. The quantized/dequantized versions of the motion-compensated residuals of the I- and P-frames MCRQ(i) are routed by the second frame flow control device 59 to a second input 58 of the second adder 56. The second adder 56 generates enhancement layer I- and P-reference frames by summing the one or more coded bit planes of the enhancement layer encoded I- and P- frames with their respective I- and P- frame residuals MCRQ(i). The enhancement layer I- and P- reference frames outputted by the second adder 56 are directed to the first flow control device 61 which selectively routes them to the first adder 52. The first adder 52 sums the enhancement layer I- and P-reference frames with their corresponding motion-compensated base layer I- and P- reference frames Ref(i) to generate the extended base layer I- and P- reference frames, which are stored in the frame memory 60 and used as described earlier for predicting the base layer B-frames.

Figure 3B:
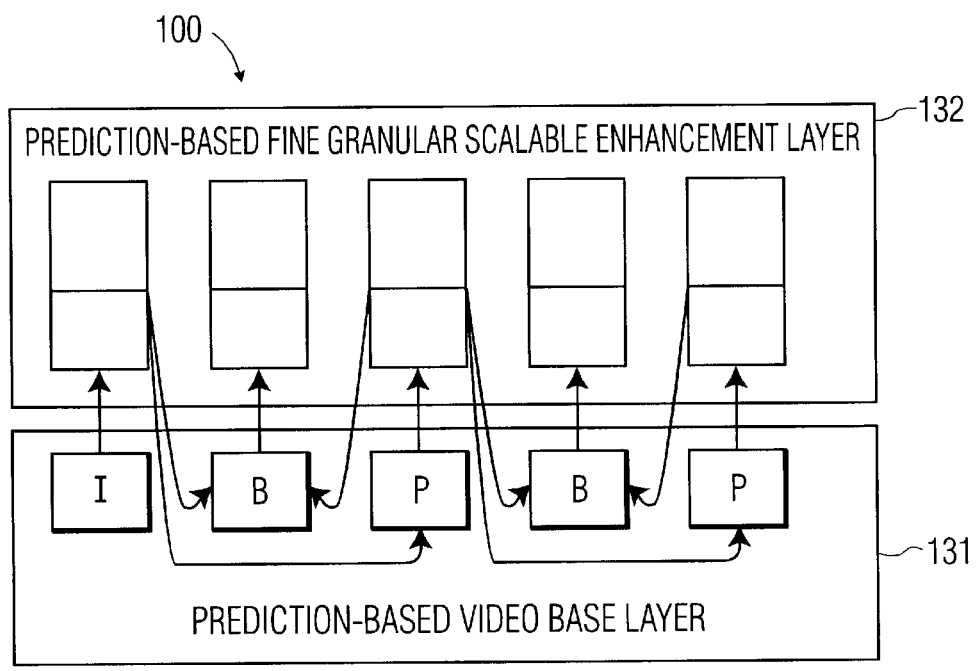
FIG. 3B shows an enhancement layer video coding scheme according to a second exemplary embodiment of the present invention.

FIG. 3B shows an enhancement layer video coding scheme 100 according to a second exemplary embodiment of the present invention. As can be seen, the video coding scheme 100 of the second embodiment is substantially identical to the video coding scheme of the first embodiment of FIG. 3A except that the interframe coded predicted P-frames of the base layer 131 are also generated from extended base layer I- or P- reference frames during base layer coding.

The video coding scheme 100 of FIG. 3B provides further improvements in the video image quality. This is because the video coding scheme 100 reduces temporal redundancy in both the P- and the B-frames of the base layer 131 because enhancement layer frames are used in the motion-compensation loop.

Figure 1:
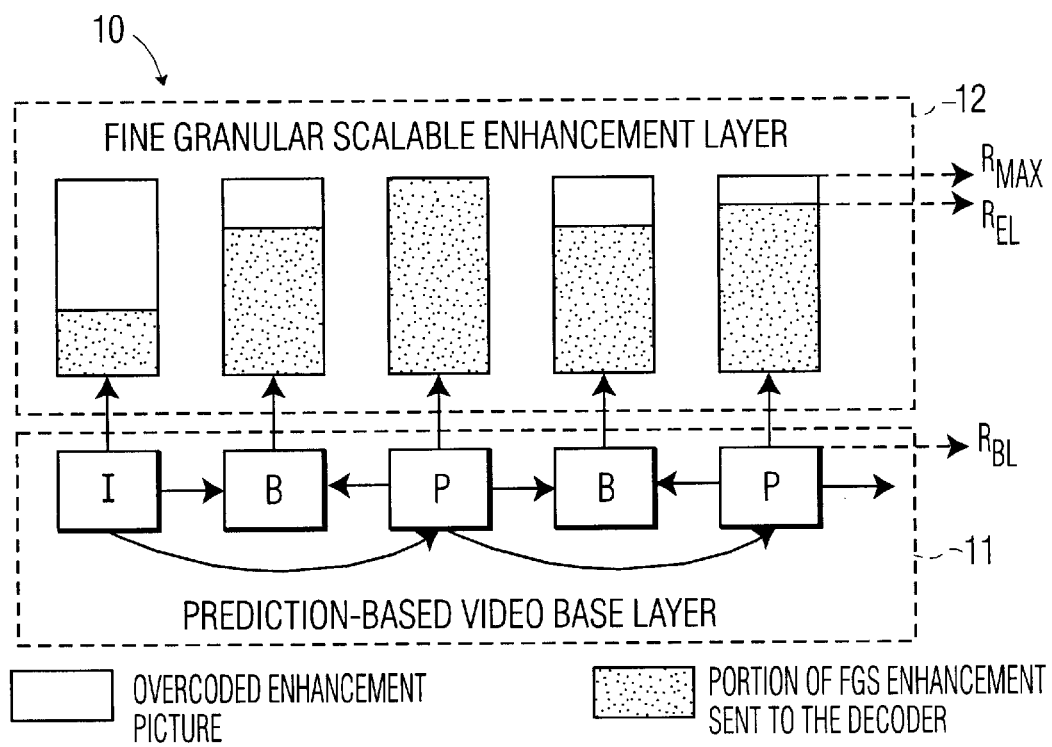
FIG. 1 shows a current enhancement layer video coding scheme.
Figure 2:
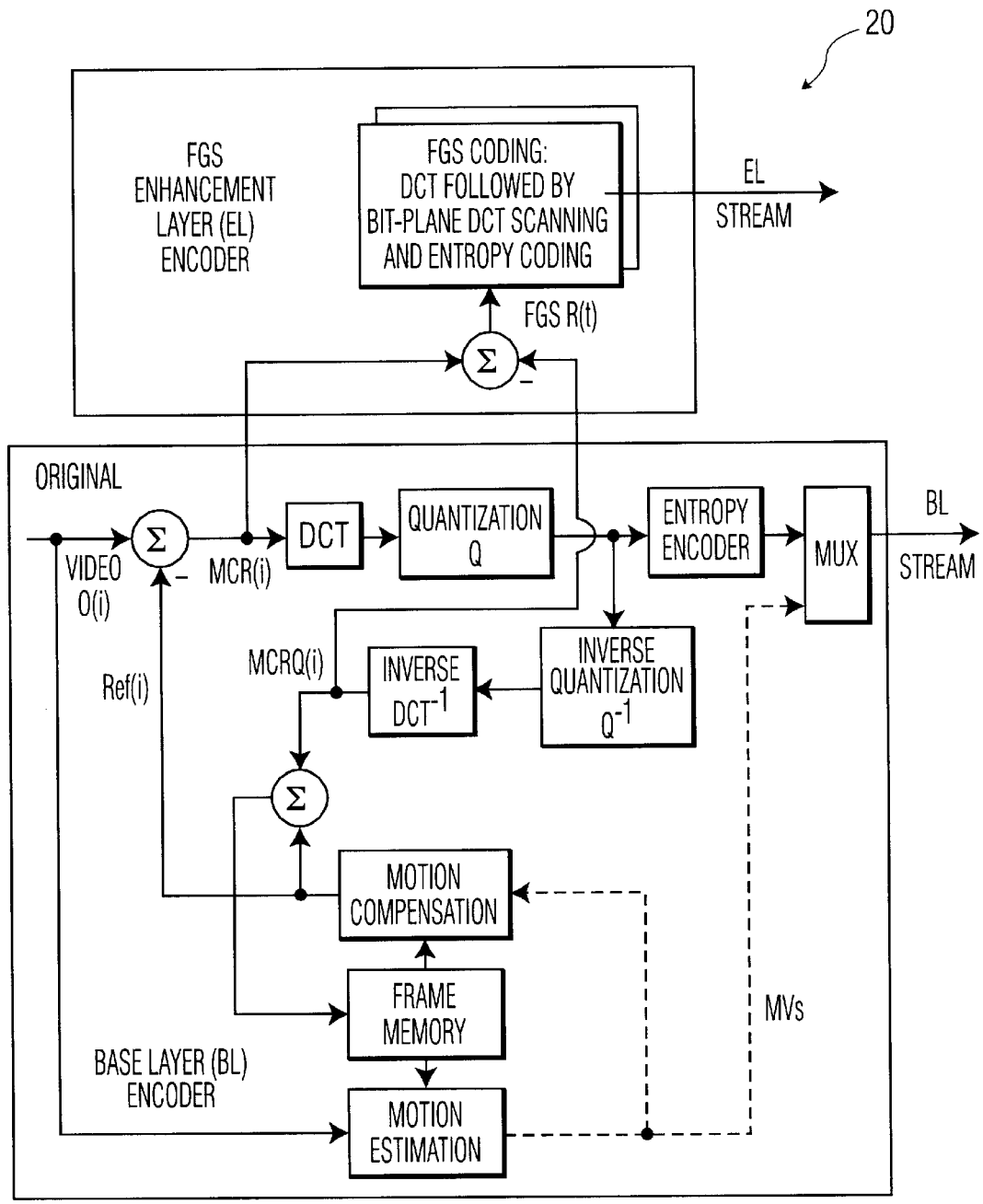
FIG. 2 shows a block-diagram of a conventional encoder for coding the base layer and enhancement layer of the video coding scheme of FIG. 1.

The video coding schemes of the present invention can be alternated or switched with the current video coding scheme of FIG. 1 for the various portions of a video sequence or for various video sequences. Additionally, switching can be performed among the video coding schemes of FIGS. 3A, 3B and the current video coding scheme of FIG. 1, and/or the video coding schemes described in the earlier-mentioned copending U.S. Patent Applications and/or other video coding schemes. Such switching of video coding schemes can be done based on channel characteristics and can be performed at encoding or at transmission time. Further the video coding schemes of the present invention achieve a large gain in coding efficiency with only a limited increase in complexity.

Figure 5:
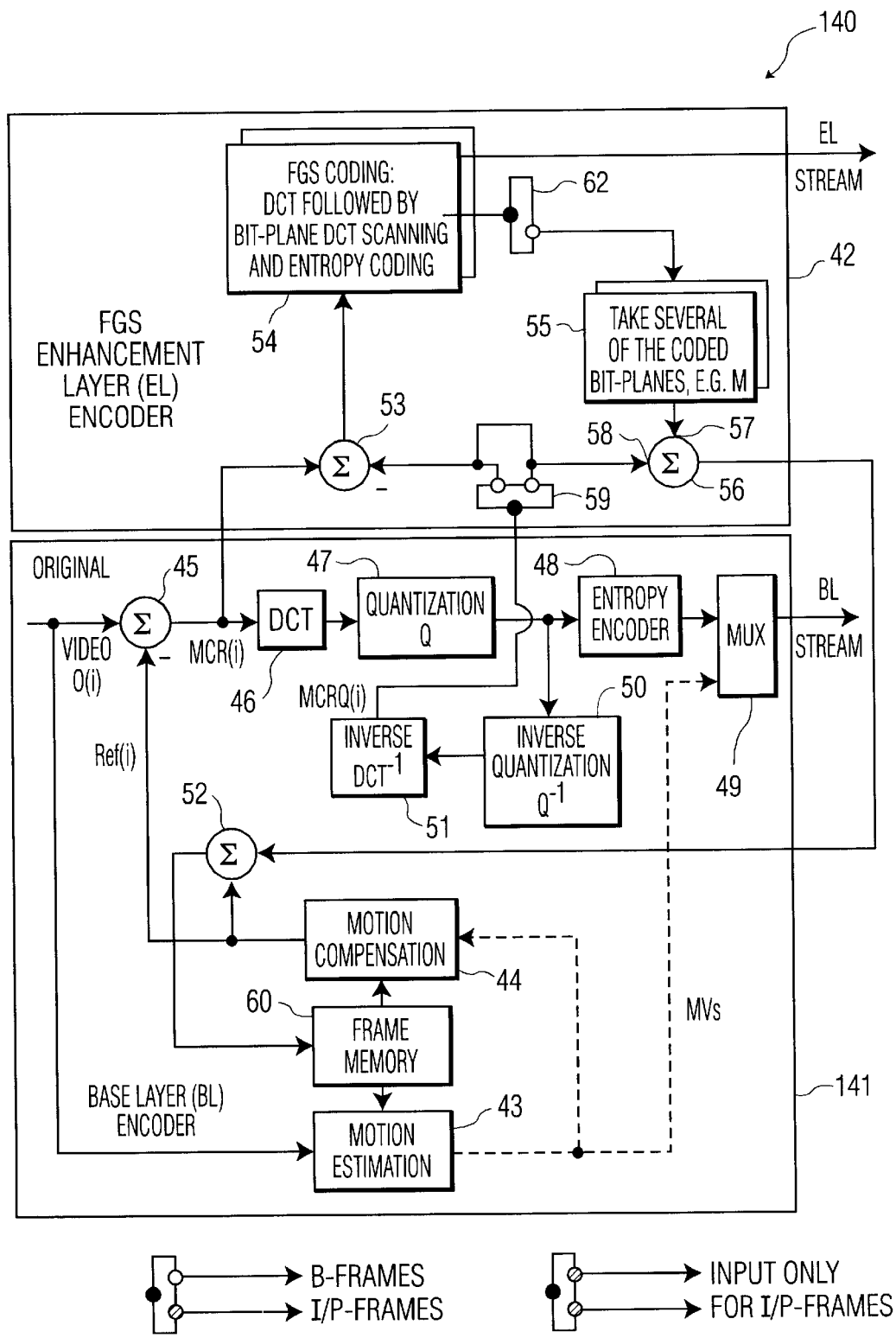
FIG. 5 shows a block-diagram of an encoder, according to an exemplary embodiment of the present invention, that may be used for generating the enhancement layer video coding scheme of FIG. 3B.

FIG. 5 shows a block-diagram of an encoder 140, according to an exemplary embodiment of the present invention, that may be used for generating the enhancement layer video coding scheme of FIG. 3B. As can be seen, the encoder 140 of FIG. 5 is substantially identical to the encoder 40 of FIG. 4 (which is used for generating the enhancement layer video coding scheme of FIG. 3A), except that the frame flow control device 61 used in the encoder 40 is omitted. The frame flow control device 61 is not necessary in this encoder 140 because motion compensation for both the base layer P- frames and the base layer B-frames is based on extended base layer I- and P- reference frames, which contain at least a portion of the enhancement layer coding. Hence, the first adder 52 only generates extended base layer I- and P-reference frames, which are stored in the frame memory 60 (no conventional base layer reference frames are generated or stored in the frame memory 60).

Figure 6:
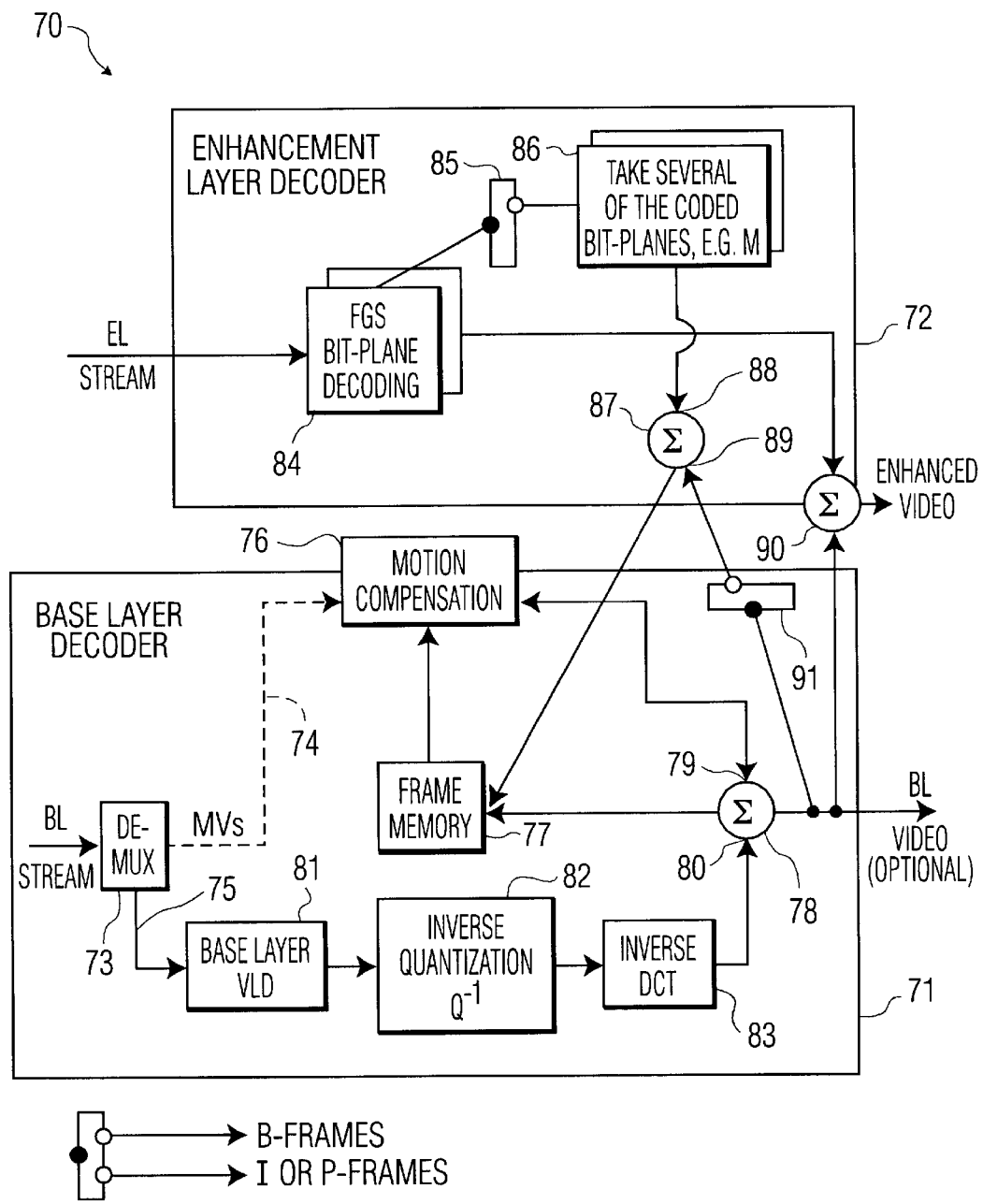
FIG. 6 shows a block-diagram of a decoder, according to an exemplary embodiment of the present invention, that may be used for decoding the compressed base layer and enhancement layer streams generated by the encoder of FIG. 4.

FIG. 6 shows a block-diagram of a decoder 70, according to an exemplary embodiment of the present invention, that may be used for decoding the compressed base layer and enhancement layer streams generated by the encoder 40 of FIG. 4. As can be seen, the decoder 70 includes a base layer decoder 71 and an enhancement layer decoder 72. The base layer decoder 71 includes a demultiplexer 73 which receives the encoded base layer stream and demultiplexes the stream into first and second data streams 74, 75. The first data stream 74, which includes motion information (motion vectors and motion prediction modes) is applied to the motion compensator 76. The motion compensator 76 uses the motion information and the video frames stored in an associated base layer frame memory 77 to reconstruct conventional base layer (I- and P-) reference frames and the extended base layer reference (I- and P-) frames that are applied to a first input 79 of a first adder 78. The second data stream 75 is applied to a base layer variable length code decoder 81 for decoding, and to an inverse quantizer 82 for dequantizing. The dequantized coefficients are applied to an inverse discrete cosine transform decoder 83 where the dequantized code is transformed into the base layer frame residuals which are applied to a second input 80 of the first adder 78. The first adder 78 sums the base layer P-frame residuals with their respective base layer reference frames and outputs the motion-predicted P- frames. (The base layer I-frame residuals are outputted by the first adder 78 as base layer I-frames.) The first adder 78 also sums the base layer B-frame residuals with their respective extended base layer (I- and P-) reference frames to generate the motion-predicted B-frames. The I- and P- base layer frames outputted by the first adder 78 are stored in the base layer frame memory 77. Additionally, the I-, P-, and B-frames outputted by the first adder 78 may be optionally outputted as a base layer video.

The enhancement layer decoder 72 includes an FGS bit-plane decoder 84 or like scalable decoder that decodes the compressed enhancement layer stream to generate differential I-, P-, and B- frame residuals (enhancement layer frames), which are applied to a second adder 90. The I- and P- frame residuals are also selectively routed by a first frame flow control device 85 to a masking device 86 that takes one or more of the reconstructed enhancement-layer bit-planes (or fractions thereof) of the frame residuals and applies them to a first input 88 of a third adder 87. The base layer (I- and P-) frames outputted by the first adder 78 of the base layer decoder 71 are selectively routed by a second frame flow control device 91 to a second input 89 of the third adder 87. The third adder 87 sums the (I- and P-) enhancement-layer bit-planes with the base layer (I- and P-) frames to generate the extended base layer reference (I- and P-) frames, which are stored in the frame memory 77 and used in the base layer decoder 71 for predicting the base layer B-frames as described above. The second adder 90 sums the enhancement layer I-, P-, and B-frames with their respective base layer I-, P-, and B-frames to generate an enhanced video.

Figure 7:
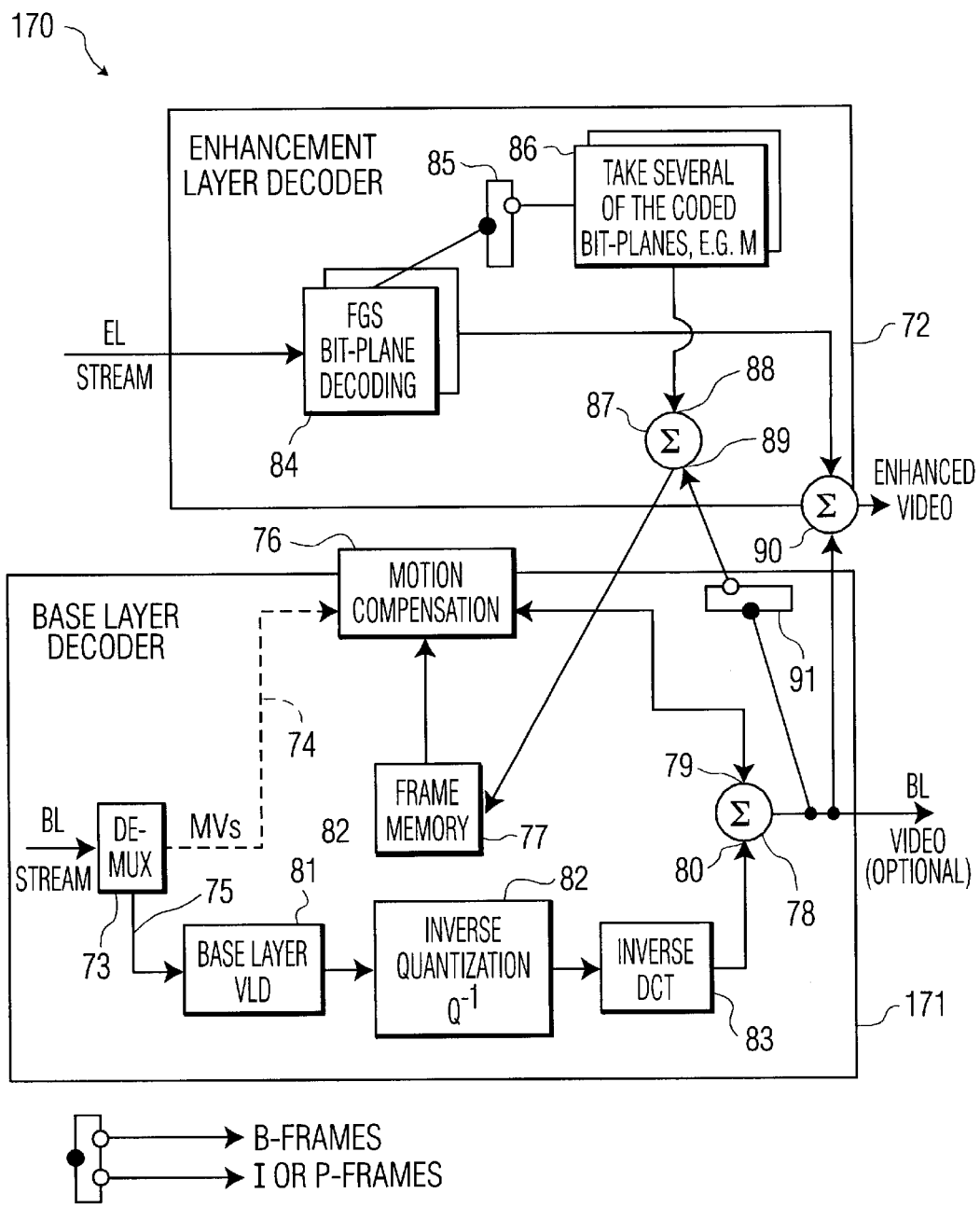
FIG. 7 shows a block-diagram of a decoder, according to an exemplary embodiment of the present invention, that may be used for decoding the compressed base layer and enhancement layer streams generated by the encoder of FIG. 5.

FIG. 7 shows a block-diagram of a decoder 170, according to an exemplary embodiment of the present invention, that may be used for decoding the compressed base layer and enhancement layer streams generated by the encoder 140 of FIG. 5. As can be seen, the decoder 170 of FIG. 7 is substantially identical to the decoder 70 of FIG. 6, except that the base layer frames generated in the first adder 78 are not stored in the base layer frame memory 77. This is not necessary because both the P- and B-frames are predicted using only the extended base layer reference (I- and P-) frames stored in the frame memory 77. Accordingly, no base layer reference frames are stored in the frame memory 77.

Figure 8:
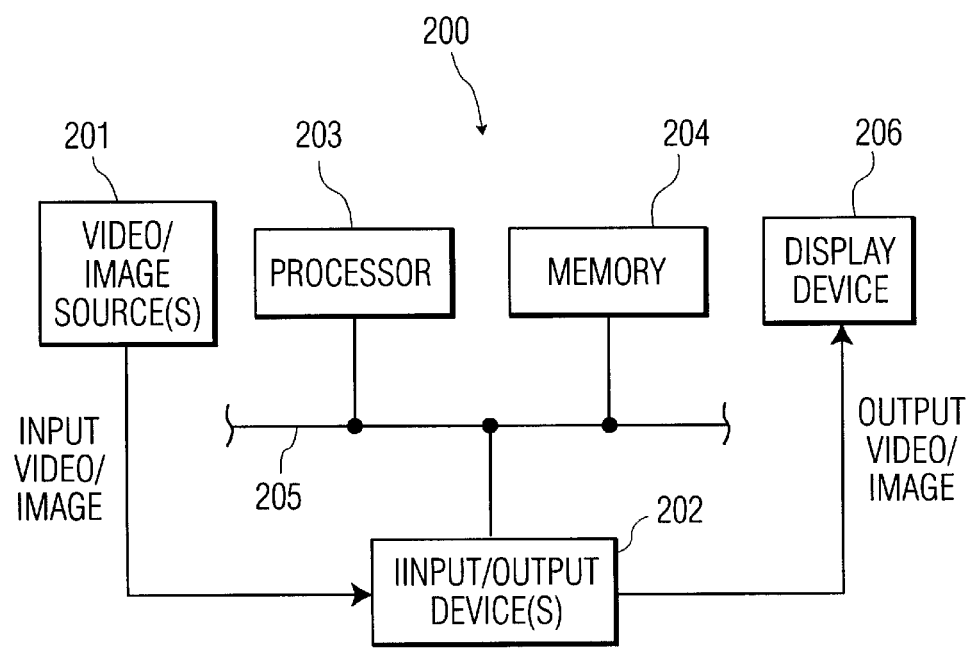
FIG. 8 shows an exemplary embodiment of a system which may be used for implementing the principles of the present invention.

FIG. 8 shows an exemplary embodiment of a system 200 which may be used for implementing the principles of the present invention. The system 200 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 200 includes one or more video/image sources 201, one or more input/output devices 202, a processor 203 and a memory 204. The video/image source(s) 201 may represent, e.g., a television receiver, a VCR or other video/image storage device. The source(s) 201 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 202, processor 203 and memory 204 may communicate over a communication medium 205. The communication medium 205 may represent, e.g., a bus, a communication network, one or more internal connections of a circuit, circuit card or other device, as well as portions and combinations of these and other communication media. Input video data from the source(s) 201 is processed in accordance with one or more software programs stored in memory 204 and executed by processor 203 in order to generate output video/images supplied to a display device 206.

In a preferred embodiment, the coding and decoding employing the principles of the present invention may be implemented by computer readable code executed by the system. The code may be stored in the memory 204 or read/downloaded from a memory medium such as a CD-ROM or floppy disk. In other embodiments, hardware circuitry may be used in place of, or in combination with, software instructions to implement the invention. For example, the elements shown in FIGS. 4–6 may also be implemented as discrete hardware elements.

While the present invention has been described above in terms of specific embodiments, it is to be understood that the invention is not intended to be confined or limited to the embodiments disclosed herein. For example, other transforms besides DCT can be employed, including but not limited to wavelets or matching-pursuits. In another example, other embodiments of the invention may employ only motion compensation in the base layer for just the P-frames. These and all other such modifications and changes are considered to be within the scope of the appended claims.

What is claimed is:

1. A method of coding video, comprising the steps of:
  encoding an uncoded video to generate extended base layer reference frames, each of the extended base layer reference frames including a base layer reference frame and at least a portion of an associated enhancement layer reference frame;

predicting base layer frames from the extended base layer reference frames; and generating frame residuals from the uncoded video and the base layer frames.

2. A method of coding video according to claim 1, further comprising the step of coding the frame residuals with a scalable codec to generate enhancement layer frames.

3. A method of coding video according to claim 1, further comprising the step of coding the frame residuals with a fine granular scalable codec to generate fine granular scalable enhancement layer frames.

4. A method of coding video according to claim 1, wherein the base layer frames include base layer B-frames.

5. A method of coding video according to claim 4, wherein the base layer frames further include P-frames.

6. A method of coding video according to claim 1, wherein the base layer frames include P-frames. frames.

7. A method of decoding a compressed video having a base layer stream and an enhancement layer stream, the method comprising the steps of:

decoding the base layer and enhancement layer streams to generate extended base layer reference frames, each of the extended base layer reference frames including a base layer reference frame and at least a portion of an associated enhancement layer reference frame; and predicting base layer frames from the extended base layer reference frames.

8. A method of decoding video according to claim 7, wherein the decoding step further generates enhancement layer frames; and further comprising the step of generating an enhanced video from the base layer frames and the enhancement layer frames.

9. A method of decoding video according to claim 7, wherein the base layer frames include B-frames.

10. A method of decoding video according to claim 9, wherein the base layer frames further include P-frames.

11. A method of decoding video according to claim 7, wherein the base layer frames include P-frames.

12. A method of decoding video according to claim 7, further comprising the step of generating a video from the base layer frames.

13. A memory medium for encoding video, the memory medium comprising:

code for encoding an uncoded video to generate extended base layer reference frames, each of the extended base layer reference frames including a base layer reference frame and at least a portion of an associated enhancement layer reference frame;

code for predicting base layer frames from the extended base layer reference frames; and code for generating frame residuals from the uncoded video and the base layer frames.

14. A memory medium for encoding video according to claim 13, further comprising code for scalable encoding the frame residuals.

15. A memory medium for encoding video according to claim 13, further comprising code for fine granular scalable encoding the frame residuals.

16. A memory medium for encoding video according to claim 13, wherein the base layer frames include B-frames.

17. A memory medium for encoding video according to claim 16, wherein the base layer frames further include P-frames.

18. A memory medium for encoding video according to claim 13, wherein the base layer frames include P-frames.

19. A memory medium for decoding a compressed video having a base layer stream and an enhancement layer stream, the memory medium comprising:

code for decoding extended base layer reference frames from the base layer and enhancement layer streams, each of the extended base layer reference frames including a base layer reference frame and at least a portion of an associated enhancement layer reference frame; and code for predicting base layer frames from the extended base layer reference frames.

20. A memory medium for decoding a compressed video according to claim 19, wherein the code for decoding extended base layer reference frames further generates enhancement layer frames; and further comprising code for generating an enhanced video from the base layer frames and the enhancement layer frames.

21. A memory medium for decoding a compressed video according to claim 19, wherein the base layer frames include B-frames.

22. A memory medium for decoding a compressed video according to claim 21, wherein the base layer frames further include P-frames.

23. A memory medium for decoding a compressed video according to claim 19, wherein the base layer frames include P-frames.

24. A memory medium for decoding a compressed video according to claim 19, further comprising code for generating a video from the base layer frames.

25. An apparatus for coding video, the apparatus comprising:

means for encoding an uncoded video to generate extended base layer reference frames, each of the extended base layer reference frames including a base layer reference frame and at least a portion of an associated enhancement layer reference frame;

means for predicting base layer frames from the extended base layer reference frames; and means for generating frame residuals from the uncoded video and the base layer frames.

26. An apparatus for coding video according to claim 25, further comprising means for scalable encoding the frame residuals.

27. An apparatus for coding video according to claim 25, further comprising code for fine granular scalable encoding the frame residuals.

28. An apparatus for coding video according to claim 25, wherein the base layer frames include B-frames.

29. An apparatus for coding video according to claim 28, wherein the base layer frames further include P-frames.

30. An apparatus for coding video according to claim 25, wherein the base layer frames include P-frames.

31. An apparatus for decoding a compressed video having a base layer stream and an enhancement layer stream, the apparatus comprising:

means for decoding extended base layer reference frames from the base layer and enhancement layer streams, each of the extended base layer reference frames including a base layer reference frame and at least a portion of an associated enhancement layer reference frame; and means for predicting base layer frames from the extended base layer reference frames.

32. An apparatus for decoding a compressed video according to claim 31, wherein the means for decoding extended base layer reference frames further generates enhancement layer frames; and further comprising means for generating an enhanced video from the base layer frames and the enhancement layer frames.

33. An apparatus for decoding a compressed video according to claim 31, wherein the base layer frames include B-frames.

34. An apparatus for decoding a compressed video according to claim 33, wherein the base layer frames further include P-frames.

35. An apparatus for decoding a compressed video according to claim 31, wherein the base layer frames include P-frames.

* * * * *